3,417,057
RAPID PRODUCTION OF LINEAR POLYESTERS
BY TRANSESTERIFICATION
Johannes R. L. Heinze, Rudolstadt-Schwarza, and Hellmut
 A. Ramm and Hans G. Richardt, Rudolstadt, Germany,
 assignors to Veb Chemiefaserwerk Schwarza "Wilhelm
 Pieck," Rudolstadt, Germany
No Drawing. Filed July 15, 1965, Ser. No. 472,360
2 Claims. (Cl. 260—75)

ABSTRACT OF THE DISCLOSURE

Rapid production of linear polyesters and copolyesters by transesterification of dialkyl esters of aromatic dicarboxylic acids with glycols comprising the improvement of discontinuing the transesterification reaction when at least 50%, preferably 75–95%, of the ester used as starting material has been converted, by sealing off the access to the refluxing column and thereby causing alcohol formed in the transesterification reaction to be distilled directly together with the glycol, the temperature rising simultaneously to about 240° C. By the process a time-saving of about one fifth up to one third can be effected over the known processes.

---

The present invention relates to a quick method for the production of linear polyesters and mixed or copolyesters respectively, particularly polyethylene glycol terephthalate. The process is based on trans-esterification of dialkyl esters with glycols in the presence of catalysts and subsequent polycondensation of the resulting trans-esterification products.

It is known to produce polyesters and mixed or copolyesters according to the trans-esterification method by polycondensation of the resulting trans-esterification products. In the method here referred to, the transesterification reaction is carried out in such a manner that dialkyl esters are reacted with an excess of the glycols used for the conversion to the corresponding glycol esters in the presence of trans-esterification catalysts, and that the reaction is completed by distilling off methanol. Subsequently, the excess glycol is removed and the preliminary condensation carried out under normal pressure and/or under reduced pressure, with ensuing vacuum polycondensation.

It has already when suggested that a methanol glycol mixture be distilled off in the trans-esterification reaction, and that the excess glycol be distilled off completely or partly. Furthermore, continuous trans-esterification methods are also known.

However, the known methods have the disadvantage that a complete reaction requires long reaction times in the trans-esterification reaction. The trans-esterification reaction is much slower toward the end than at the beginning. Besides, a larger glycol excess has necessarily a negative effect on the reaction time, since it must be removed by distillation. Extended reaction times in conjunction with the relative high temperatures result in the formation of glycol ether, which has a harmful effect on the quality of filaments, fibers, sheets, etc.

It is, therefore, an object of the present invention to provide a method which permits to overcome the shortcomings of the methods hitherto used in the production of linear polyesters and copolyesters by trans-esterification of dialkyl esters with glycols.

It is a further object to provide a quick method for the production of linear polyesters and copolyesters by trans-esterification of dialkyl esters with glycols by simple and economical operations. Other objects and advantages will become apparent from the following detailed description.

It was found that a rapid transformation into the high polymer state can be achieved when the trans-esterification reaction is discontinued after at least 50%, and preferably 75 to 95%, of the amount calculated on starting material has been converted into the desired glycol ester.

The discontinuation of the trans-esterification reaction and the change-over to the pre-condensation are effected in such a manner that the alcohol formed is distilled off directly together with the glycol. The access to the column is sealed off; at the same time the temperature is increased.

The complete reaction to diglycol ester and its oligomers is effected during the pre-condensation either by the glycol formed in the reaction, or by proportional amounts of excess glycol and reaction glycol.

The discontinuation of the trans-esterification reaction, after conversion has occurred to a certain degree, depends on the amount of glycol used, on the temperature course during the trans-esterification and pre-condensation, on the amount of glycol of reaction produced during pre-condensation, and on the type and amount of catalyst or catalyst-combination used. The method, according to the invention, also applies to those cases where either the theoretical amount of glycol necessary for the reaction, or a lesser amount, is used. Care should be taken that not more glycol is distilled off than is formed in the pre-condensation.

One embodiment of the method according to the invention relates to the reaction of dimethyl terephthalate and ethylene glycol.

The method according to the invention can be used for both discontinuous and continuous operation.

The technical progress achieved with the method, according to the invention, consists in the particularly great economy of the method due to the short reaction times involved. In general it may be stated that a time-saving of about one fifth up to one third can be effected. Of course the time-saving mainly depends on the moment of discontinuation of trans-esterification.

It is possible to use small amounts of excess glycol and the reaction glycol formed is used for the complete trans-esterification. The amount of glycol needed is thus reduced.

By the rapid conversion of dialkyl esters and glycols into a polyester and copolyester respectively, we obtain a high-grade product which can be successfully processed in a spinning or sheet casting process to filaments, fibers, sheets and the like.

The invention will now be more fully explained in a number of examples, but it should be understood that these are given by way of illustration and not of limitation and that many changes in the details can be made without departing from the spirit of the invention.

EXAMPLE 1

100 parts dimethyl terephthalate and 68 parts ethylene glycol are reacted in a heatable reaction vessel provided with a stirrer in the presence of a catalyst at temperatures above 150° C. The catalyst consists of 0.03 mol percent of $Mn^{II}$ acetate and 0.03 mol percent $Sb_2O_3$. (The same catalyst is used in all the examples.) The methanol formed is distilled off over a column. After 28 parts methanol have been split off, corresponding to a conversion of 85%, the trans-esterification is discontinued at a temperature of 195° C. In the subsequent pre-condensation, the unreacted portion of dimethyl terephthalate is trans-esterified by excess glycol still present and by the reaction glycol formed above 195° C. The remaining 15 parts methanol are distilled off directly together with the glycol. The total reaction is completed at a temperature of 235° C. After introducing the melt into the polycondensation vessel, evacuation is effected, with subsequent polycondensation at 280° C. The polyethylene glycol terephthalate thus obtained has a relative solution viscosity of $\eta=1.37$ (measured with 0.5% solution of phenol-tetrachloroethane in a ratio of 1:1) and a melting point of 261.7° C. The reaction time has been reduced by about 30%.

EXAMPLE 2

The same mixture as in Example 1 is used and the methanol formed in the trans-esterification is distilled off together with the excess glycol over a column. The transesterification is discontinued at 215° C. with a conversion of 92%. The unreacted portion is trans-esterified during the subsequent pre-condensation at temperatures above 215° C. with the liberated reaction glycol. The remaining methanol is distilled off directly with additional available reaction glycol. The polycondensation is effected according to Example 1. The viscosity of the polyethyleneglycol terephthalate is $\eta=1.365$, the melting point is 262.2° C.

EXAMPLE 3

100 parts dimethyl terephthalate are trans-esterified with 64 parts ethylene glycol (theoretical amount) in the presence of a catalyst at temperatures above 150° C. The methanol formed is distilled off over a column. The trans-esterification reaction is discontinued at a reaction temperature of 197° C. with a conversion of 90%. The remaining conversion is brought about during the subsequent pre-condensation above 197° C. by the reaction glycol formed in sufficient amounts, and the methanol is distilled off directly together with the glycol not required for the reaction. Subsequently the evacuation and polycondensation are effected as described in Example 1. The polyethylene-glycol-terephthalate obtained has a relative viscosity of $\eta=1.42$ and a melting point of 261.2° C.

EXAMPLE 4

100 parts dimethyl terephthalate are trans-esterified with 57.6 parts ethylene glycol (90% of theoretical amount) in the presence of a catalyst at temperatures above 150° C. and the methanol formed is distilled off over a column. The trans-esterification reaction is stopped at a conversion of 85% and a reaction temperature of 195° C. The further procedure is the same as described in Example 3.

The polyethyleneglycol-terephthalate obtained has a relative viscosity of $\eta=1.405$ and a melting point of 262.5° C.

The process according to the invention may also be used successfully for making mixed or copolyesters wherein, e.g. mixtures of starting materials are used consisting of dimethylterephthalate with adipic acid ester, with sebacic acid ester, or with isophthalic acid ester.

Furthermore, it is possible to use glycol mixtures, e.g. ethylene glycol/butane diol, or ethylene glycol/hexane diol.

EXAMPLE 5

95 parts dimethyl terephthalate and 5 parts adipic acid dimethyl ester are trans-esterified and polycondensed as described in Example 1. The so obtained copolyester has a melting point of 251° C. and a relative solution viscosity of 1.36. The reaction time is reduced by about 30%.

EXAMPLE 6

90 parts dimethyl terephthalate and 10 parts sebacic acid dimethyl ester are trans-esterified and polycondensed as described in Example 1.

The copolyester has a melting point of 231° C., and a relative solution viscosity of $1.38_7$. The reaction time is reduced by about 25%.

EXAMPLE 7

90 parts dimethyl terephthalate and 10 parts dimethyl isophthalate are trans-esterified and polycondensed as described in Example 1.

The copolyester has a relative viscosity of 1.40. The reaction time is reduced by about 25%.

EXAMPLE 8

80 parts dimethyl isophthalate and 20 parts dimethyl terephthalate are trans-esterified and polycondensed as described in Example 1.

The copolyester has a melting point of 144–146° C. and a relative viscosity of 1.28. The reaction time is reduced by about 20%.

EXAMPLE 9

100 parts dimethyl terephthalate, 5 parts butane diol and 65 parts ethylene glycol are trans-esterified and polycondensed as described in Example 1.

The copolyester has a melting point of 236 to 238° C., and a relative visocity of 1.33. The reaction time is reduced by about 30%.

We claim:
1. In a method for production of linear polyesters and copolyesters by transesterification of dialkylesters of aromatic dicarboxylic acids with glycols in the presence of catalyst at temperatures above 150° C., with glycols being refluxed, and subsequent polycondensation of the so obtained transesterification products, the improvement which comprises shortening the time of the entire process by about 25–30% by dicontinuing the transesterification reaction with a conversion of at least 50% and at the utmost 95% of the ester used as a starting material through sealing off the access to the refluxing column thus causing alcohol formed in the reaction and glycol to be distilled directly, with simultaneous rise in temperature to about 240° C.

2. The method as claimed in claim 1, wherein in the trans-esterification reaction the amount of glycol used ranges from substoichiometric to theoretical amounts.

References Cited

UNITED STATES PATENTS

| | | | |
|---|---|---|---|
| 3,192,184 | 6/1965 | Brill et al. | 260—75 |
| 3,196,131 | 7/1965 | Mayer et al. | 260—75 |
| 3,252,941 | 5/1966 | Mayer et al. | 260—75 |
| 2,973,341 | 2/1961 | Hippe et al. | 260—75 |

WILLIAM H. SHORT, *Primary Examiner.*

LOUISE P. QUAST, *Assistant Examiner.*

U.S. Cl. X.R.

260—475